US010559118B2

(12) United States Patent
Hurter (10) Patent No.: US 10,559,118 B2
(45) Date of Patent: Feb. 11, 2020

(54) POINT OF VIEW SELECTION IN VIRTUAL 3D ENVIRONMENT

(71) Applicant: ECOLE NATIONALE DE L'AVIATION CIVILE, Toulouse (FR)

(72) Inventor: Christophe Hurter, Toulouse (FR)

(73) Assignee: ECOLE NATIONALE DE L'AVIATION CIVILE, Toulouse (FR)

( * ) Notice: Subject to any disclaimer, the term of this patent is extended or adjusted under 35 U.S.C. 154(b) by 0 days.

(21) Appl. No.: 15/463,436

(22) Filed: Mar. 20, 2017

(65) Prior Publication Data

US 2017/0278300 A1   Sep. 28, 2017

(30) Foreign Application Priority Data

Mar. 24, 2016   (EP) ..................................... 16305335

(51) Int. Cl.
| | |
|---|---|
| *G06T 15/40* | (2011.01) |
| *G06T 15/20* | (2011.01) |
| *G06T 15/08* | (2011.01) |
| *G06T 19/00* | (2011.01) |

(52) U.S. Cl.
CPC .............. *G06T 15/20* (2013.01); *G06T 15/08* (2013.01); *G06T 15/40* (2013.01); *G06T 19/003* (2013.01)

(58) Field of Classification Search
CPC ....... G06T 14/40; G06T 15/405; G06T 15/06; G06T 15/005; G06T 15/20
USPC ......................................................... 345/421
See application file for complete search history.

(56) References Cited

U.S. PATENT DOCUMENTS

| | | | | |
|---|---|---|---|---|
| 2005/0275654 A1* | 12/2005 | Matsumoto | ............. | G06T 15/08 345/421 |
| 2011/0026795 A1* | 2/2011 | Leber | ..................... | A61B 6/037 382/131 |

FOREIGN PATENT DOCUMENTS

| | | |
|---|---|---|
| WO | 02/069272 A2 | 9/2002 |
| WO | 2013/142072 A2 | 9/2013 |

OTHER PUBLICATIONS

M. Ruiz, I. Boada, I. Viola, S. Bruckner, M. Feixas, and M. Sbert "Obscurance-based Volume Rendering Framework" IEEE/ EG Symposium on Volume and Point-Based Graphics (2008), [retrieved on May 13, 2018]. Retrieved from the Internet <URL: http://citeseerx.ist.psu.edu/viewdoc/download?doi=10.1.1.447.2816&rep=rep1&type=pdf>.*

(Continued)

*Primary Examiner* — Gordon G Liu
(74) *Attorney, Agent, or Firm* — Meagher Emanuel Laks Goldberg & Liao, LLP (57) ABSTRACT

In a crowded representation of a virtual three dimensional space defined in terms of voxels, an object of interest will often be occluded by one or more objects of varying densities between the virtual camera defining the user's point of view, and the object of interest. To automatically identify an optimal camera position, an number of candidate positions are considered, for example situated at the vertices of a regular polyhedron centred on the object of interest. For each of these candidate positions, a ray is cast towards the object of interest, and the occlusion for each intervening voxel is determined as the product of that voxel's density, and a density transfer function. The virtual camera position corresponding to the least occluded path is then selected as the new point of view.

14 Claims, 9 Drawing Sheets

(56) References Cited

OTHER PUBLICATIONS

European Search Report for 16305335.8 dated Sep. 2, 2016.
Samuel M Song et al., "Three-Dimensional electronic unpacking of packed bags using 3-D CT images", Optomechatronic Micro/Nano Devices and Components III : Oct. 8-10, 2007, Lausanne, Switzerland: Proceedings of SPIE, vol. 7246 Jan. 18, 2009, pp. 72460Y-72461Y.

* cited by examiner

POINT OF VIEW SELECTION IN VIRTUAL 3D ENVIRONMENT

FIELD OF THE INVENTION

The present invention relates to the assisted exploration of computer generated virtual environments, and in particular the selection of optimal points of view having regard to the presence of occlusive objects.

BACKGROUND OF THE INVENTION

Volumetric datasets are found in many fields, such as engineering, material sciences, medical imaging, astrophysics. The exploration of volumetric datasets is not trivial, and is heavily impacted by the specific needs of users. In most airports for example, security agents deal with such data exploration in the context of baggage inspections. X-ray and tomography are two commonly used fluoroscopic scanning systems. X-ray systems provide a flattened 2D luggage scan while tomography systems produce transversal scans, also called slices. Thanks to data processing techniques such as the Radon transform, these systems can produce a full 3D scan, comprising a set of voxels with corresponding density data. Since the resulting X-ray scanned image only contains voxel or pixel densities, it cannot display the original material colours. The standard colour visual mapping uses three different colours (orange, green, and blue) to display the data density. Orange colour corresponds to low density (mainly organic items). In opposition, blue colour is used for high density values (i.e. metal). In the case of X-ray systems, green colour corresponds to the superposition of different kinds of materials or average density materials.

Figure 1:
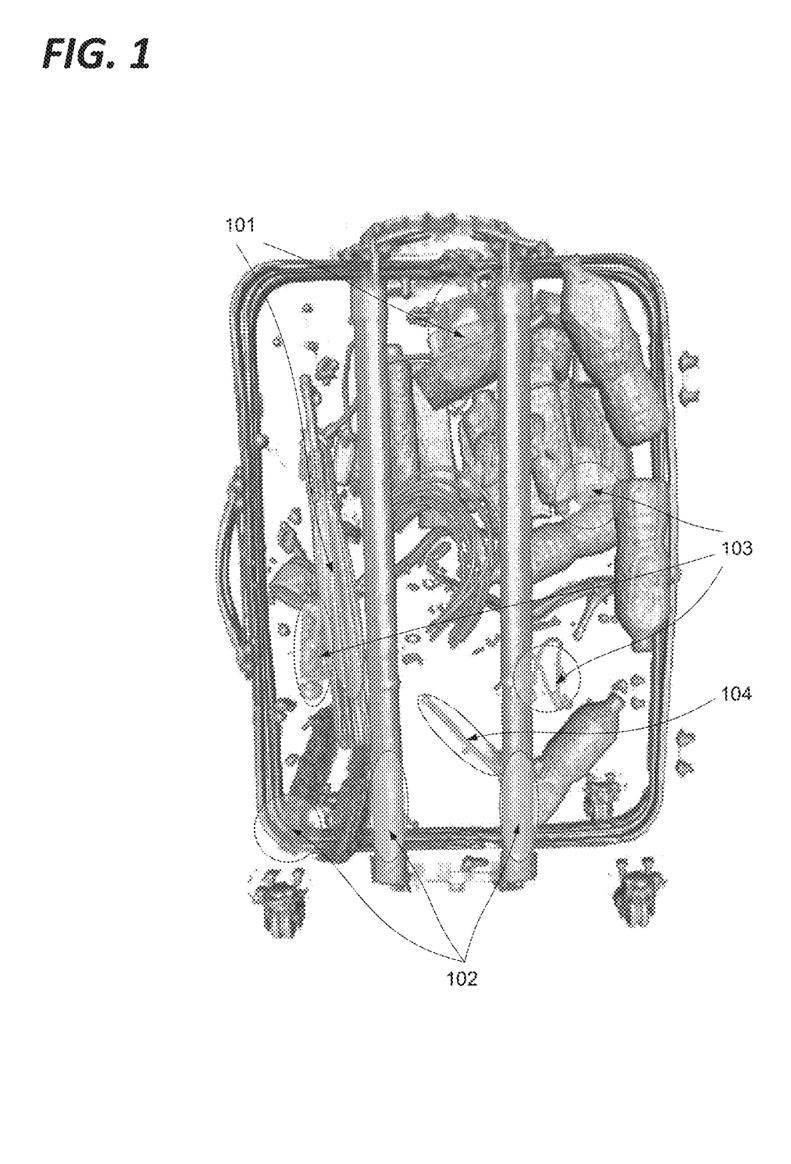
FIG. 1 demonstrates some of the ways in which an article may be obscured in a scan.

FIG. 1 demonstrates some of the ways in which an article may be obscured in a scan. As shown in FIG. 1, the displayed 2D scanned image can suffer from four issues:

Superposition: A threat (e.g. prohibited object like knife, cutter . . . ) may be sheltered behind dense materials. Sometimes, it's possible to see through this blind shield using functionalities such as high penetration (enhanced X-ray power) or image processing (contrast improvement). As shown in FIG. 1, the umbrella and dense collection of objects in the upper right hand corner 101 may obscure articles of interest.

Location: Depending on its location inside the luggage, a threat can be difficult to detect. Objects located in the corners, in the edges or inside the luggage's frame are very difficult to identify. As shown in FIG. 1, the retractable trolley bars and the rigid corners of the case 102 may obscure articles of interest.

Dissociation: Another way to dissimulate a threat is to separate and to spread parts of it in the luggage (weapons or explosives are composed of many separated items like the trigger, the barrel . . . ). This dissociation can be combined with other dissimulation techniques. As shown in FIG. 1, a number of apparently non-descript items 103 are present which are unlikely to attract particular attention, but which may be assembled to form some article of interest.

Lure: An ill-intentioned individual may use a lure to hide the real threat. For instance, a minor threat like a small scissors may be clearly visible and catch security agent's attention while a more important threat remains hidden. As shown in FIG. 1, the metal rod 104 may attract the attention of the user, drawing it away from some less visible threat.

Volumetric data exploration with direct volume rendering techniques is of great help to visually extract relevant structures in many fields of science: medical imaging, astrophysics and more recently in luggage security. To leverage this knowledge extraction, many techniques have been developed. A number of existing basic technologies are known in this field, including volume visualization, transfer function, direct voxel manipulation and focus plus context interaction.

In particular, volume visualization can be done with geometric rendering system which transforms the data into a set of polygons representing an iso-surface. The contour tree algorithm and other alternatives such as branch decomposition are usually used to find these iso-surfaces. Contour tree algorithms can be vulnerable to noise, which can be problematic in luggage inspections since dense materials such as steel cause noise by reflecting the X-rays.

In order to investigate a volumetric dataset, one can use the Transfer Function (TF). In practice, this maps the voxel density with a specific colour (including its transparency). Transfer functions can be 1, 2 or n dimensional and are of great help to isolate structures of interest in volumetric data. Thanks to the colour blending process, a suitable transfer function can also reveal iso-surfaces or hide density to improve the volumetric data visualization.

A specific difficulty arises in an environment such as that described with respect to FIG. 1 is that the user's view of a particular article of interest will often be obscured by a number of other objects of no interest. While in conventional systems the user is obliged to manually reposition the virtual camera determining his point of view so as to attempt to see through these obstacles, it is desirable to provide a mechanism for determining an acceptable point of view with a reduced need for user interaction.

SUMMARY OF THE INVENTION

In accordance with a first aspect there is provided a method of positioning a virtual camera in a 3D computer generated environment comprising a plurality of virtual objects defined as a plurality of voxels, such positioning affording a view of a selected one of said objects with minimum occlusion from the other said objects. The method comprises the steps of:

calculating a total occlusion value for each of a plurality of predefined virtual camera positions with respect to a reference point within the selected object, wherein each total occlusion value is determined by calculating the respective path from each virtual camera position to the reference point and identifying each voxel along that path, calculating an occlusion value for each voxel along each respective path by multiplying that voxel's density by a transfer function value defined for that respective density, summing the occlusion values determined for all voxels along each respective path calculated for a respective said predefined virtual camera position to obtain a total path occlusion value, selecting the predefined virtual camera position corresponding to the path with the lowest total path occlusion value, and causing the display a graphical representation of said 3D computer generated environment corresponding to the selected predefined virtual camera position. The automatic provision of optimal view points obviates the need for intervening exploratory actions driven by a user, and thus reduces demand on system resources.

According to a development of the first aspect, there is defined an occlusion threshold, and where at said step of calculating an occlusion value for each voxel along each said respective path, the occlusion value of any voxel not meeting said threshold is considered to be zero. By simplifying the occlusion calculation in this way, the benefits of the invention are achieved with reduced processing effort.

According to a development of the first aspect, at said step of calculating an occlusion value for each voxel along each said respective path, the occlusion value of any voxel meeting said threshold is considered to have a predetermined value. By simplifying the occlusion calculation in this way, the benefits of the invention are achieved with reduced processing effort.

According to a development of the first aspect, the plurality of predefined virtual camera positions are specified such that each said path passes through a respective vertex of a regular polyhedron. Situating the virtual camera positions with regular angular relationships to the subject gives a good chance of finding an acceptable point of view without the need for foreknowledge of the contents of the environment, further simplifying and accelerating processing.

According to a further development of the first aspect, each path is of equal length. Situating the virtual camera positions at a fixed distance to the subject renders the behaviour of the interface more intuitive for a user, thereby reducing system demands in the long term.

According to a further development of the first aspect, the respective path from each virtual camera position to the desired object is determined as the path from each predefined virtual camera position to the centre of mass of the selected object. In many contexts, assuming a user's focus of interest to align with the centre of mass will provide good alignment with the user's intentions without the need to gather specific user input, thereby reducing system calls and other drains on system resources.

According to a further development of the first aspect, the respective path from each virtual camera position to the desired object is determined as the path from each predefined virtual camera position to the geometric centre of the selected object. In many contexts, assuming a user's focus of interest to align with the centre of mass will provide good alignment with the user's intentions without the need to gather specific user input, thereby reducing system calls and other drains on system resources.

According to a further development of the first aspect, the steps of calculating the respective path from each said virtual camera position, calculating an occlusion value for each voxel along each respective path and summing the number of occlusions, are repeated for each of a plurality of reference points belonging to said selected object. By investing additional effort in identifying an optimal viewpoint initially, the need for intervening exploratory actions driven by a user is further reduced, and thus reduces demand on system resources in the long term.

According to a further development of the first aspect, the plurality of reference points comprises one for every outermost voxel of said selected object meeting a specified density threshold. In many contexts, low density voxels represent peripheral materials that the user will not consider to be relevant as the focus of his attention. By disregarding these voxels, the benefits of the invention are achieved with reduced processing effort.

According to a further development of the first aspect, there is provided a further step of detecting a part of the selected object presenting a known feature, and wherein the reference point belonging to the selected object with respect to which said plurality of paths is calculated is specified as being situated in said detected part. By proactively attempting to identify a part of an object mist likely to be of interest to a user, other parts can be disregarded, the benefits of the invention are achieved with reduced processing effort. Furthermore, this approach further obviates the need for intervening exploratory actions driven by a user, and thus further reduces demand on system resources.

According to a further development of the first aspect, there is provided an additional step of adjusting the orientation of the selected virtual camera to best correspond to the orientation of the selected object. In many contexts, adjusting the orientation of the selected virtual camera renders the behaviour of the interface more intuitive for a user, thereby reducing system demands in the long term.

According to a further development of the first aspect, there are provided the additional steps of calculating the length of the path through each voxel, and multiplying the occlusion value for each voxel by the length of the path through it. By investing additional effort in identifying an optimal viewpoint initially, the need for intervening exploratory actions driven by a user is further reduced, and thus reduces demand on system resources in the long term.

According to a second aspect, there is provided an apparatus adapted to implement the method of the first aspect.

According to a third aspect there is provided an apparatus adapted to position a virtual camera in a 3D computer generated environment comprising a plurality of objects defined as a plurality of voxels, such positioning affording a view of a selected one of said objects with minimum occlusion from the other objects. The apparatus is adapted to calculate a total occlusion value for each of a plurality of predefined virtual camera positions with respect to a reference point within said selected object, wherein each said total occlusion value is determined by calculating the respective path from each said virtual camera position to the reference point, and identifying each voxel along said path, calculating an occlusion value for each voxel along each said respective path by multiplying that voxel's density by a transfer function value defined for that respective density. The apparatus is further adapted to sum the occlusion values determined for all voxels along each said respective path calculated for a respective said predefined virtual camera position to obtain a total path occlusion value. The apparatus is still further adapted to select the predefined virtual camera position corresponding to the path with the lowest total path occlusion value, said apparatus being further adapted to enable display of a graphical representation of the 3D computer generated environment corresponding to said selected predefined virtual camera position.

According to a fourth aspect, there is provided computer program adapted to implement the first aspect.

BRIEF DESCRIPTION OF THE DRAWINGS

The above and other advantages of the present invention will now be described with reference to the accompanying drawings, in which.

DETAILED DESCRIPTION

Figure 2:
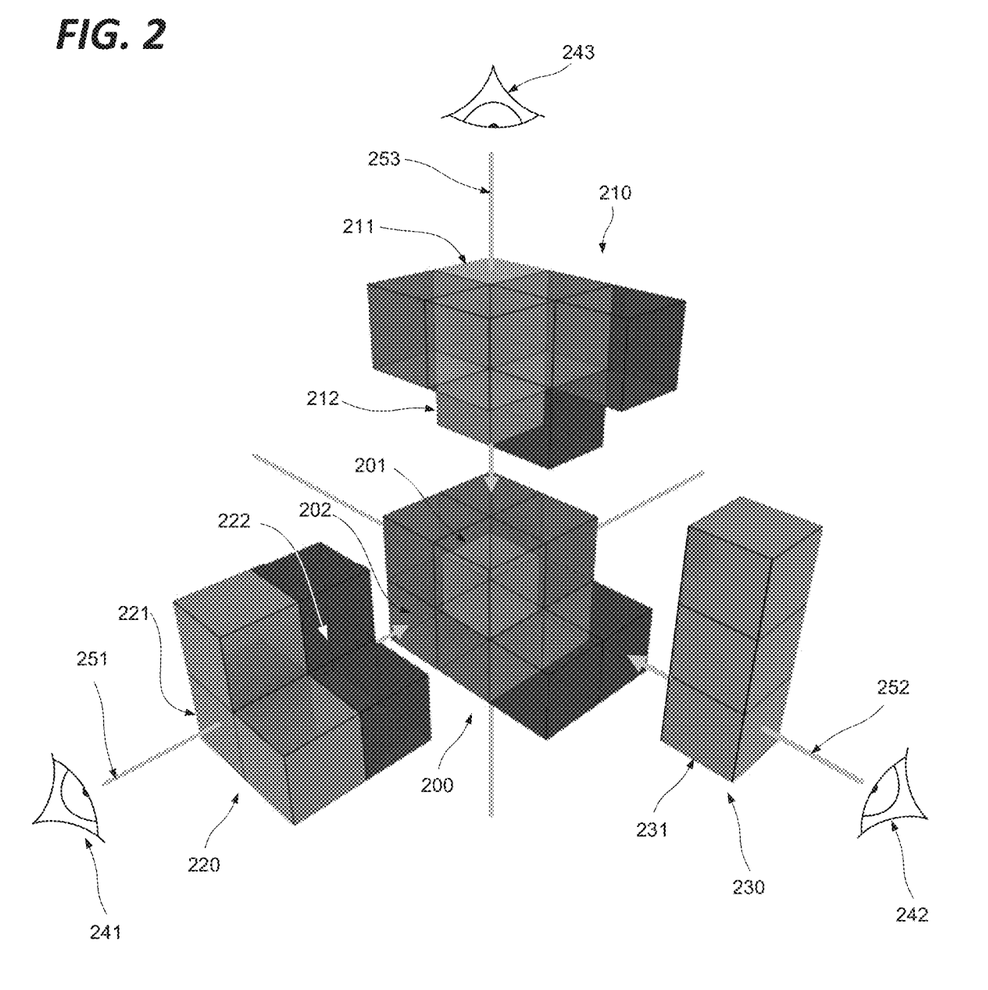
FIG. 2 shows a 3D computer generated environment comprising a plurality of virtual objects.

FIG. 2 shows a 3D computer generated environment comprising a plurality of virtual objects. As shown in FIG. 2, there is provided an object of interest 200, and three obstructing objects 210, 220 and 230. Each object is defined by a number of adjacent voxels, represented by cubes in FIG. 2. Each voxel has and associated density value. The density of each voxel in FIG. 2 is represented by its opacity, so that as shown there are three levels of density-high density materials are shown as pale and opaque, medium density materials are mid grey and somewhat transparent, and low density materials are dark in colour, and highly transparent. The conflation of density and transparency is deliberate, since in the context of the scanning technologies in question denser materials are generally less permeable to the rays used to develop the images. Often, a particular object will appear as a dense core, with lower density boundary, which may be caused by an outer decorative or protective layer of actually lower density, or due to aliasing effects where the actual edge of an object fails to coincide exactly with the edges of corresponding voxels. It will be appreciated that FIG. 2 is highly simplified for the purposes of presenting embodiments of the present invention, and that real datasets may include many more objects each containing many more voxels, more closely packed, with random orientations.

Figure 3:
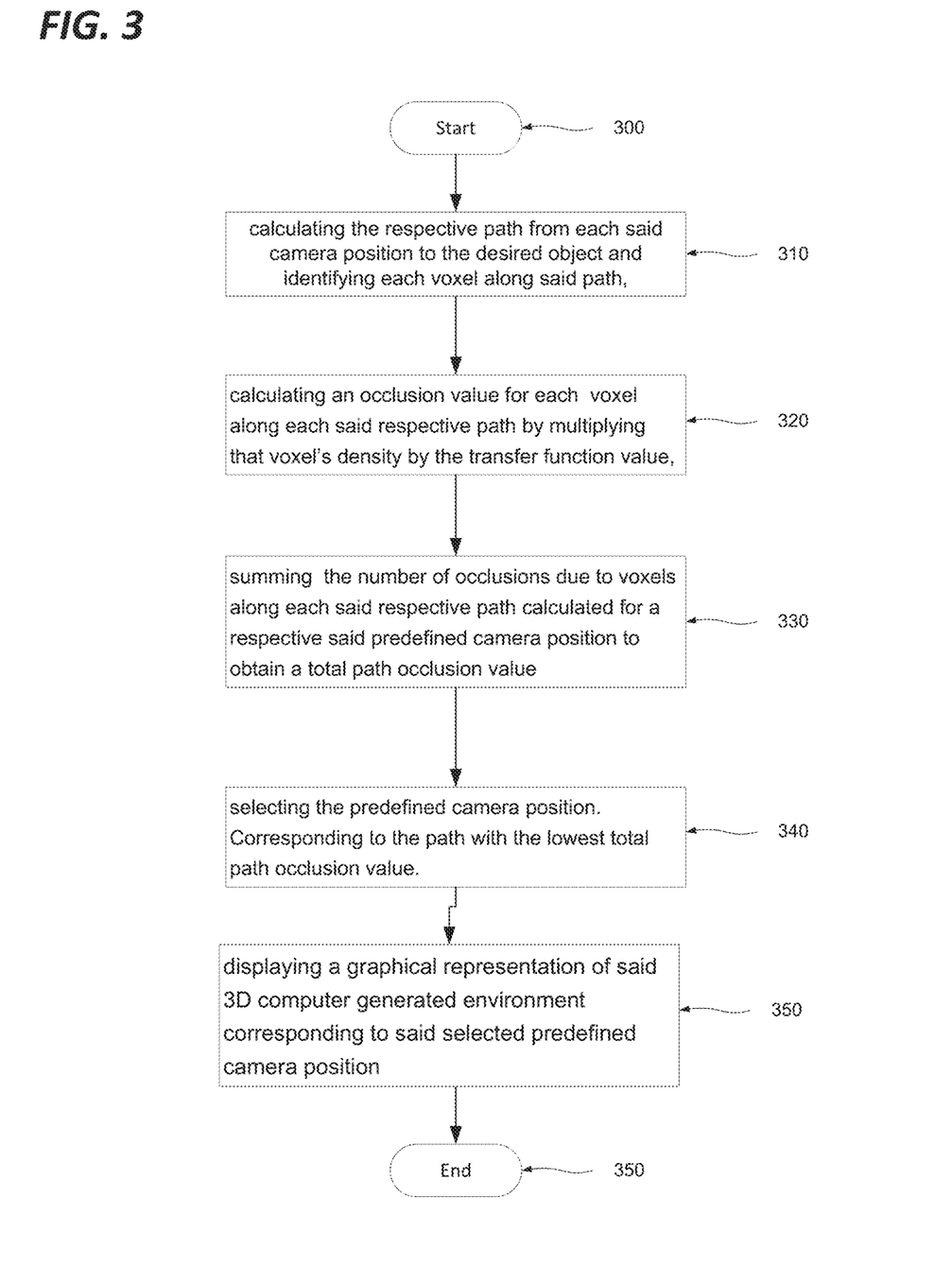
FIG. 3 shows the steps of a method in accordance with an embodiment.

FIG. 3 shows the steps of a method in accordance with an embodiment.

More particularly, FIG. 3 shows a method of positioning a virtual camera in a 3D computer generated environment such as that described with reference to FIG. 2, comprising a plurality of virtual objects such as objects 200, 210, 220, 230. The position is such as to afford a view of a selected object 200 with minimum occlusion from the other objects 210, 220, 230. In accordance with the embodiment of FIG. 3, an occlusion value is calculated for each of a plurality of predefined virtual camera positions with respect to said object. In FIG. 2, these predefined virtual camera positions may correspond to the eye positions 241, 242 and 243 shown in FIG. 2. As shown in FIG. 2, the three virtual camera positions 241, 242 and 243 are situated on three respective orthogonal axes 251, 252, 253, the origin of which is cantered on the central voxel 201 of the selected object 200.

It will be appreciated that while for the sake of simplicity the following detailed embodiment will be described with reference to this simple situation with three orthogonally oriented virtual camera positions, the present invention is applicable to any number of virtual camera positions. Indeed, generally speaking the more positions are considered, the better the final selected point of view is likely to be, all other things being equal, so that the main constraint to the number of points considered is likely to be the processing capacity of the computing hardware implementing the process. This is of course likely to evolve over time, so that what may constitute a realistic maximum today may be perceived as a minimum as technology develops. Similarly, while the relative solid angles of the three positions shown in FIG. 2 are constant, it is entirely possible that positions may be selected having variable angular relationships. In accordance with certain embodiments, the virtual camera positions may be situated at the vertices, or though the centre of each face, of a regular polyhedron such as a platonic solid, whose centre corresponds to the centre, or some other point within the selected object 200. In the case of FIG. 2, it would be a simple matter to extend the chosen positions to the 3 opposite positions on each of the axes.

As shown in FIG. 3, the method starts at step 300 before proceeding to step 310 at which wherein each said occlusion value is determined by calculating the respective path from each said virtual camera position to the desired object and identifying each voxel along said path.

For example, considering FIG. 2, if the reference point of the selected object is the centre of the voxel 201, and the calculation is performed for the virtual camera position 241, the path is represented by the line 251. As such, the path passes through high density voxels 221 and low density voxel 222 before reaching the outer surface of the object 200. Similarly, if the reference point of the selected object is the centre of the voxel 201, and the calculation is performed for the virtual camera position 242, the path is represented by the line 252. As such, the path passes through high density voxel 231 before reaching the outer surface of the object 200. Finally, if the reference point of the selected object is the centre of the voxel 201, and the calculation is performed for the virtual camera position 243, the path is represented by the line 253.

The method next proceeds to step 320, at which an occlusion value is calculated for each voxel along each respective path by multiplying that voxel's density by the transfer function value.

Figure 4:
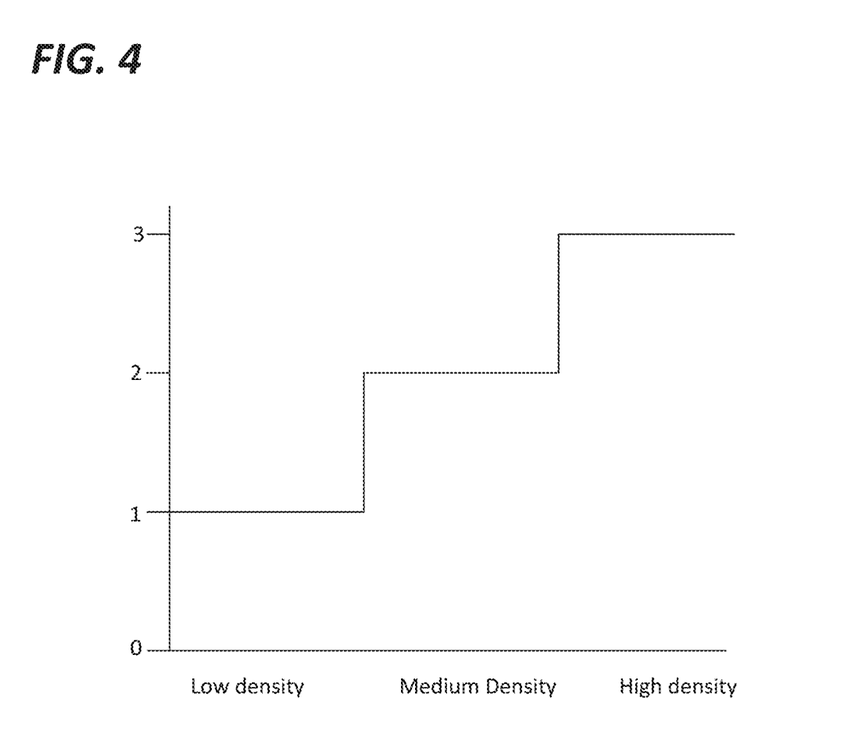
FIG. 4 shows a simplified transfer function.

FIG. 4 shows a simplified transfer function. As shown in FIG. 4, there is provided a transfer function which amplifies the prominence of high density voxels. Specifically, as shown, Low density voxels are assigned a weighting of 1, Medium density voxels are assigned a weighting of 2, and high density voxel are assigned a weighting of 3. It will be appreciated that real transfer functions will typically have many more density levels, and a less granular set of weighting factors. The scales shown are linear, but in real implementations may be logarithmic or follow some other form depending on the characteristics of typical samples and the system itself.

Applying the transfer function of FIG. 4 to step 320 of FIG. 3, since path 251 passes through high density voxels 221 and low density voxel 222. If for the sake of the example high density voxels are considered to have a density of 3, medium density voxels are considered to have a density of 2, and low density voxels are considered to have a density of 1, the path 251 has voxel occlusion values of (3×3) and (1×1). Similarly, the path represented by the line 252 passes through high density voxel 231 before reaching the outer surface of the object 200, so that the path 252 has voxel occlusion values of (3×3). Finally, the path is represented by the line 253 passes through high density voxel 211 and high density voxel 212 before reaching the outer surface of the object 200, so that the path 252 has a voxel occlusion values of (3×3) and (3×3).

In certain embodiments, there may be defined an occlusion threshold, and at step 320 when the occlusion value is calculated for each voxel along each respective path, the occlusion value of any voxel not meeting said threshold may be considered to be zero. In other words, voxels having an occlusion value below the threshold may be disregarded.

In some embodiments, such as those where voxels having an occlusion value below a threshold are disregarded, at step 320 when the occlusion value is calculated for each voxel along each the respective path, the occlusion value of any voxel meeting the threshold is considered to have a predetermined value. That is to say, all voxels meeting the threshold may be treated as having the same, predefined occlusion value.

The method next proceeds to step 330 of summing the number of occlusions due to voxels along each said respective path calculated for a respective said predefined virtual camera position to obtain a total path occlusion value.

Thus the path 251 has a total occlusion value of (3×3)+(1×1)=10. Similarly, the path represented by the line 252 has a total occlusion value of (3×3)=9. Finally, the path is represented by the line 253 has a total occlusion value of (3×3)+(3×3)=18.

In embodiments where there is defined an occlusion threshold, and where voxels meeting the threshold are assigned a predetermined value and voxels not meeting the threshold are disregarded, step 330 has the effect of counting the voxels meeting the threshold.

The method next proceeds to step 340, of selecting the predefined virtual camera position corresponding to the path with the lowest total path occlusion value.

In accordance with the example of FIGS. 2 and 4, the selected path is thus the path represented by the line 252 having a total occlusion value of 9.

Finally, the method proceeds to step 350 of displaying a graphical representation of said 3D computer generated environment corresponding to said selected predefined virtual camera position.

While certain embodiments have been described in the context of scanner technologies, it will be appreciated that the described process is applicable to any 3D computer generated environment comprising a plurality of virtual objects defined as a plurality of voxels. For example, the environment may reflect a wholly or partially artificial environment, for example corresponding to that of a game, educational or training environment or similar simulator. The environment may be defined by captured and stored data of any age, or the environment may reflect the real time input of x ray scanners such as those described above, or any other instrument or set of instruments capable of generating a three dimensional computer representation of a physical space, such as lidar, radar, sonar, and the like. The environment may still further combine two or more of stored objects, dynamically generated artificial objects and detected real objects, for example in an augmented reality setting.

The displaying of the graphical representation of the 3D computer generated environment may be two or three dimensional, and may be displayed by any suitable display means for the type of representation.

Where the reference position as regards the distribution of virtual camera positions corresponds to the centre of the selected object, it will be appreciated that the centre itself may correspond to the centre of mass of the object in question, which may readily be calculated in view of the availability of density information, or may correspond to the geometric centre of the object. In determining the centre, certain voxels, for example those falling below a specified density threshold, or those representing excrescences from the main body of the object may be disregarded. Still further, the reference point of the object may not correspond to any centre of the object. It may be selected as the densest voxel of the object.

Still further, the method of FIG. 3 may be carried out for more than one voxel of the selected object. In particular, it may be carried out for every surface voxel of the object, or the every outermost voxel of the object meeting a specified density threshold.

Where the method of FIG. 3 is carried out for a plurality of voxels belonging to the same object, the virtual camera positions may be maintained in their fixed positions, implying a change of angle with respect to the object as a whole, or the virtual camera position may be shifted laterally so that the angle of the ray cast towards the object is unchanged.

In certain embodiments, the voxels of the selected object with respect to which the process of FIG. 3 is carried out may be selected on the basis of additional criteria. For example, it may be that a clear view of some particular part or feature of the object may be required. The part or feature may be selected manually by a user, or may be selected on the basis, for example of an object matching process, whereby the system looks for specific features or objects from a catalogue of known features or objects, or feature or object archetypes, and where such an object or feature is identified as part of the selected object, attempting to identify the optimal virtual camera position for viewing of the feature or object. By way of example, a gun barrel will have characteristic dimensions and density values, which may be automatically detectable even if the barrel is disguised in a conglomeration of materials forming a single physical object. In this case, the system may attempt to give the best possible view of the part of this object corresponding to the gun barrel. Similarly, it is conceivable that as system sensitivities and resolutions improve it may become feasible to detect characters on objects, for example where stamped or engraved. In such cases, it may be desirable to determine the best virtual camera position giving the user a view of such characters.

In the embodiment described with reference to FIGS. 2 and 3 it is presumed that each virtual camera position is situated at the same respective distance from the reference point. It will be appreciated that a different distance may be selected for some or all positions.

In certain embodiments, the distance between the reference position and some or all of the virtual camera positions may be set by default as the distance between the reference position and the current virtual camera position.

In some cases, certain virtual camera positions may be excluded from the process. This may be appropriate for example when the candidate virtual camera position is found to lie within another object.

In some embodiments calculations may be performed for a plurality of virtual camera positions along the same axis on the same side of the reference point. In this way, the described process can select not only a viewing angle, but also a distance from the reference point to achieve an optimal view.

It will be appreciated that where a plurality of distances from the reference point are considered, either in the context of different respective viewing angles, or for different distances at each angle, a maximum distance and a minimum distance may be set in order to ensure an acceptable perspective with respect to the selected object, since otherwise the least obstructed view will generally be immediately next to the object itself, which may provide an unsatisfactory perspective of the object.

Any virtual camera position will have an associated position in the virtual space, and an angle and distance relative to the reference point. In some embodiments it may also be important to consider the orientation of the virtual camera position in space. In other words, how directions in the virtual space are mapped into the user display. In some cases, the orientation of virtual space and the user display may both correspond to the real orientation of the physical space being scanned—the most conceptually accessible way of viewing the scan of a standing person may well be to present them upright, with their head above their feet. In other cases, choosing other orientations may be more helpful. For example, in the case where text is detected as described above, it will often be helpful to rotate the virtual camera orientation so as to present the text in its conventional orientation, regardless of the orientation of the object on which it is inscribed. Similarly, it will often be easier for a human user to understand an object if presented in the orientation in which he is used to seeing it. In this regard, the process may involve attempting to match objects in a library of objects, which may specify a preferred orientation for each object. Where it is not possible to select a preferred orientation on the basis of an identification of the object itself, it may be possible to make a decision on the basis of the object's physical characteristics, for example by ensuring that substantially cuboid articles are orientated with one surface horizontal, etc. Accordingly, in accordance with certain embodiments, the process may involve the step of determining a preferred virtual camera orientation with respect to the selected object, with reference to the nature of the object itself.

It will be appreciated that the example of FIG. 2 represents an ideal situation in certain regards, in particular in that the paths 251, 252, 253 are parallel to the three axes defining the voxels in the space, and aligned to pass through the centre of each voxel. Other arrangements to which the process of FIG. 3 may be applied need not comply with these constraints.

Figure 5:
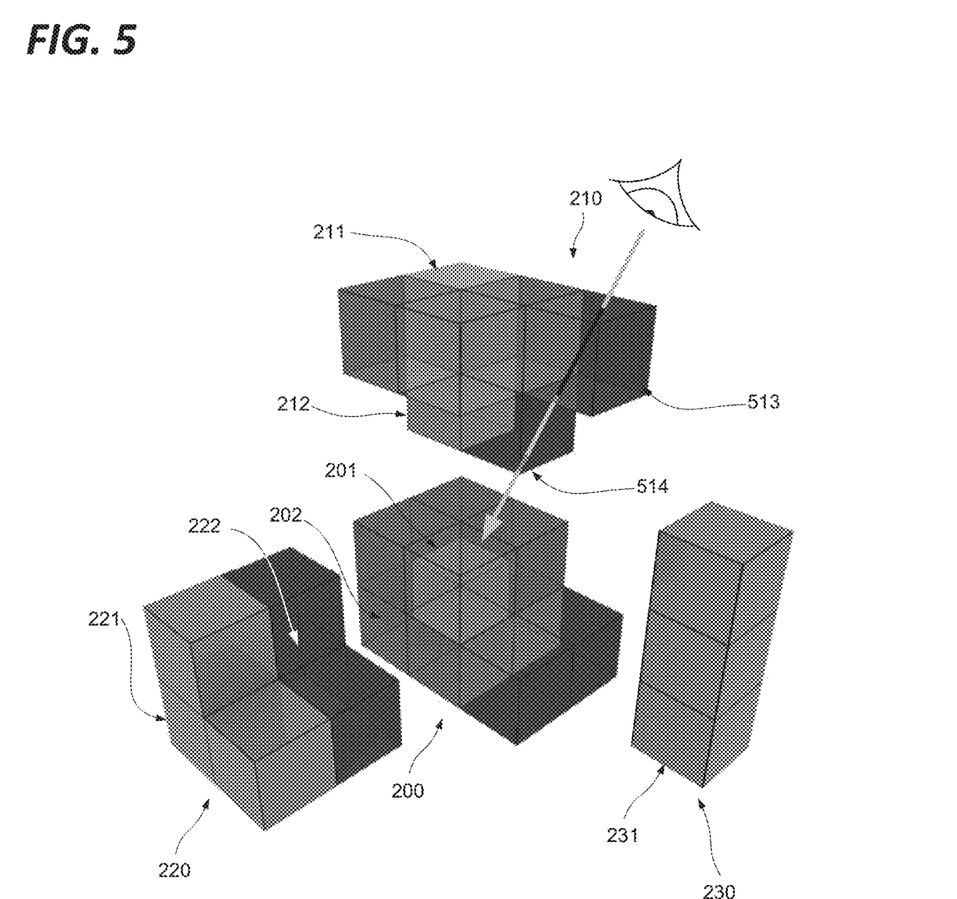
FIG. 5 shows a simple 3D computer generated environment comprising a plurality of virtual objects with an unaligned predetermined virtual camera position.

FIG. 5 shows a simple 3D computer generated environment comprising a plurality of virtual objects with an unaligned predetermined virtual camera position. The 3D environment of FIG. 5 is identical to that of FIG. 2, however in this case there is defined a virtual camera position 500. When a path is set between this virtual camera position 500 and the centre of the voxel 201, the resulting path passes obliquely though the voxel 513, and then through the corner of another voxel 514, before reaching the surface of the selected object 200. It will be noted that the length of the path through the voxel 513 is greater than the unit height of the voxel, while the length of the path through the voxel 514 is less than the unit height of a voxel.

In accordance with certain embodiments, the calculation of the occlusion value of each cell through which the path passes at step 320 as described above may simply apply a fixed occlusion value for each cell regardless of the length of the path described through that cell, equal to the density multiplied by the transfer function value as described above.

In accordance with alternative embodiments, there may be provided an additional step of calculating the length of the path through each voxel, and multiplying the occlusion value for each voxel by the length of the path through it. In this way, a more accurate accounting for the occlusion provoked by shorter or longer passages through occluding voxels is enabled.

In accordance with certain embodiments, in a crowded representation of a virtual three dimensional space defined in terms of voxels, an object of interest will often be occluded by one or more objects of varying densities between the virtual camera defining the user's point of view, and the object of interest. To automatically identify an optimal virtual camera position, a number of candidate positions are considered, for example situated at the vertices of a regular polyhedron centred on the object of interest. For each of these candidate positions, a ray is cast towards the object of interest, and the occlusion for each intervening voxel is determined as the product of that voxel's density, and a density transfer function. The virtual camera position corresponding to the least occluded path is then selected as the new point of view.

The disclosed methods can take the form of an entirely hardware embodiment (e.g.FPGA), an entirely software embodiment (for example to control a system according to the invention) or an embodiment containing both hardware and software elements. As such, embodiments may comprise a number of subsystems, functional elements or means adapted to implement the invention in communication with each other, and/or with standard fixed function or programmable elements for example as described below.

Software embodiments include but are not limited to applications, firmware, resident software, microcode, etc. The invention can take the form of a computer program product accessible from a computer-usable or computer-readable medium providing program code for use by or in connection with a computer or an instruction execution system.

A computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

In some embodiments, the methods and processes described herein may be implemented in whole or part by a user device. These methods and processes may be implemented by computer-application programs or services, an application-programming interface (API), a library, and/or other computer-program product, or any combination of such entities.

The user device may be a mobile device such as a smart phone or tablet, a drone, a computer or any other device with processing capability, such as a robot or other connected device.

Figure 6:
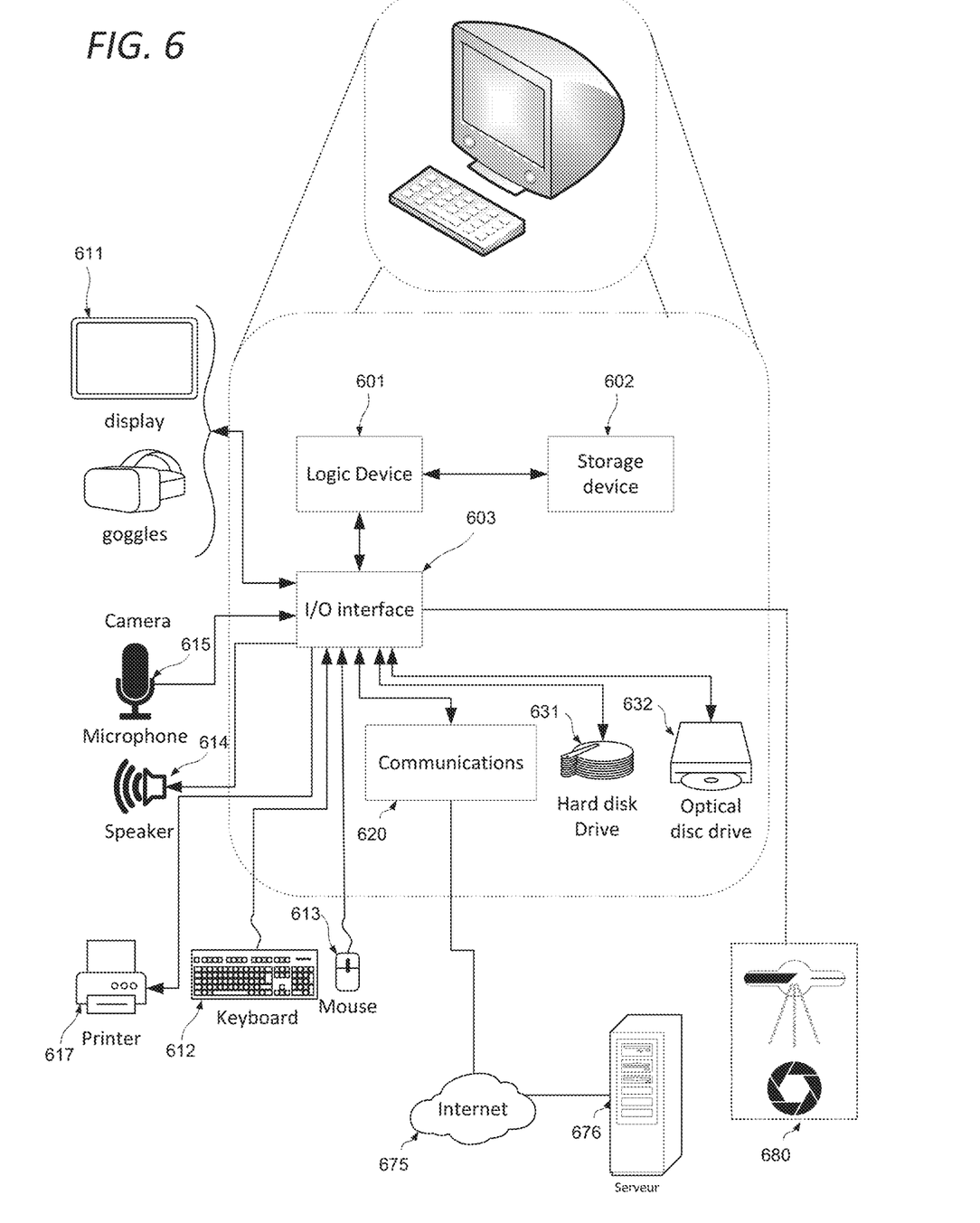
FIG. 6 shows a generic computing system suitable for implementation of embodiments of the invention.

FIG. 6 shows a generic computing system suitable for implementation of embodiments of the invention.

A shown in FIG. 6, a system includes a logic device 601 and a storage device 602. The system may optionally include a display subsystem 611, input/output subsystem 603, communication subsystem 620, and/or other components not shown.

Logic device 601 includes one or more physical devices configured to execute instructions. For example, the logic device 601 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 601 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 601 optionally may be distributed among two or more separate devices, which may be remotely located and/or configured for coordinated processing. Aspects of the logic device 601 may be virtualized and executed by remotely accessible, networked computing devices configured in a cloud-computing configuration.

Storage device 602 includes one or more physical devices configured to hold instructions executable by the logic device to implement the methods and processes described herein. When such methods and processes are implemented, the state of storage 602 device may be transformed—e.g., to hold different data.

Storage device 602 may include removable and/or built-in devices. Storage device 602 may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, floppy-disk drive, tape drive, MRAM, etc.), among others. Storage device may include volatile, non-volatile, dynamic, static, read/write, read-only, random-access, sequential-access, location-addressable, file-addressable, and/or content-addressable devices.

In certain arrangements, the system may comprise an interface 603 adapted to support communications between the Logic device 601 and further system components. For example, additional system components may comprise removable and/or built-in extended storage devices. Extended storage devices may comprise one or more types of storage device including optical memory 632 (e.g., CD, DVD, HD-DVD, Blu-Ray Disc, etc.), semiconductor memory (not shown) (e.g., RAM, EPROM, EEPROM, FLASH etc.), and/or magnetic memory 631 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 601 and storage device 602 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 6 may be used to implement embodiments of the invention.

For example a program implementing the steps described with respect to FIG. 3 may be stored in storage device 602 and executed by logic device 601. Data used for the creation of the graphical representation of the selected space may be stored in storage 602 or the extended storage devices 632 or 631 and the display 611 used to display the graphical representation.

In some cases, the computing system may comprise or be in communication with a scanner 680 or other three dimensional imaging system as described above. This communication may be achieved by wired or wireless network, serial bus, firewire, SCSI or any other communications means as desired. In such cases, a program for the control of the scanner 680 and/or the retrieval of data therefrom may run concurrently on the logic device 601, or these features may be implemented in the same program as implementing the steps described with respect to FIG. 3.

Accordingly the invention may be embodied in the form of a computer program.

Furthermore, when suitably configured and connected, the elements of FIG. 6 may constitute an apparatus adapted to generate a graphical representation of a user interface, and cause a display device to display said representation; this apparatus may further be adapted to receive data from an eye tracking system indicating a point of regard. The apparatus may comprise storage for compiling a record of the point of regard over a duration, and the apparatus may further be adapted to modify the graphical representation to indicate the proportion of the duration for which said point of regard was directed at each point in said representation.

It will be appreciated that a "service", as used herein, is an application program executable across multiple user sessions. A service may be available to one or more system components, programs, and/or other services. In some implementations, a service may run on one or more server-computing devices.

When included, display subsystem 611 may be used to present a visual representation of data held by a storage device. This visual representation may take the form of a graphical user interface (GUI). As the herein described methods and processes change the data held by the storage device 602, and thus transform the state of the storage device 602, the state of display subsystem 611 may likewise be transformed to visually represent changes in the underlying data. Display subsystem 611 may include one or more display devices utilizing virtually any type of technology for example as discussed above. Such display devices may be combined with logic device and/or storage device in a shared enclosure, or such display devices may be peripheral display devices.

When included, input subsystem may comprise or interface with one or more user-input devices such as a keyboard 612, mouse 613, touch screen 611, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. When included, communication subsystem 620 may be configured to communicatively couple computing system with one or more other computing devices. For example, communication module of may communicatively couple computing device to remote service hosted for example on a remote server 676 via a network of any size including for example a personal area network, local area network, wide area network, or internet. Communication subsystem may include wired and/or wireless communication devices compatible with one or more different communication protocols. As non-limiting examples, the communication subsystem may be configured for communication via a wireless telephone network 674, or a wired or wireless local- or wide-area network. In some embodiments, the communication subsystem may allow computing system to send and/or receive messages to and/or from other devices via a network such as internet 675. The communications subsystem may additionally support short range inductive communications with passive devices (NFC, RFID etc).

Figure 7:
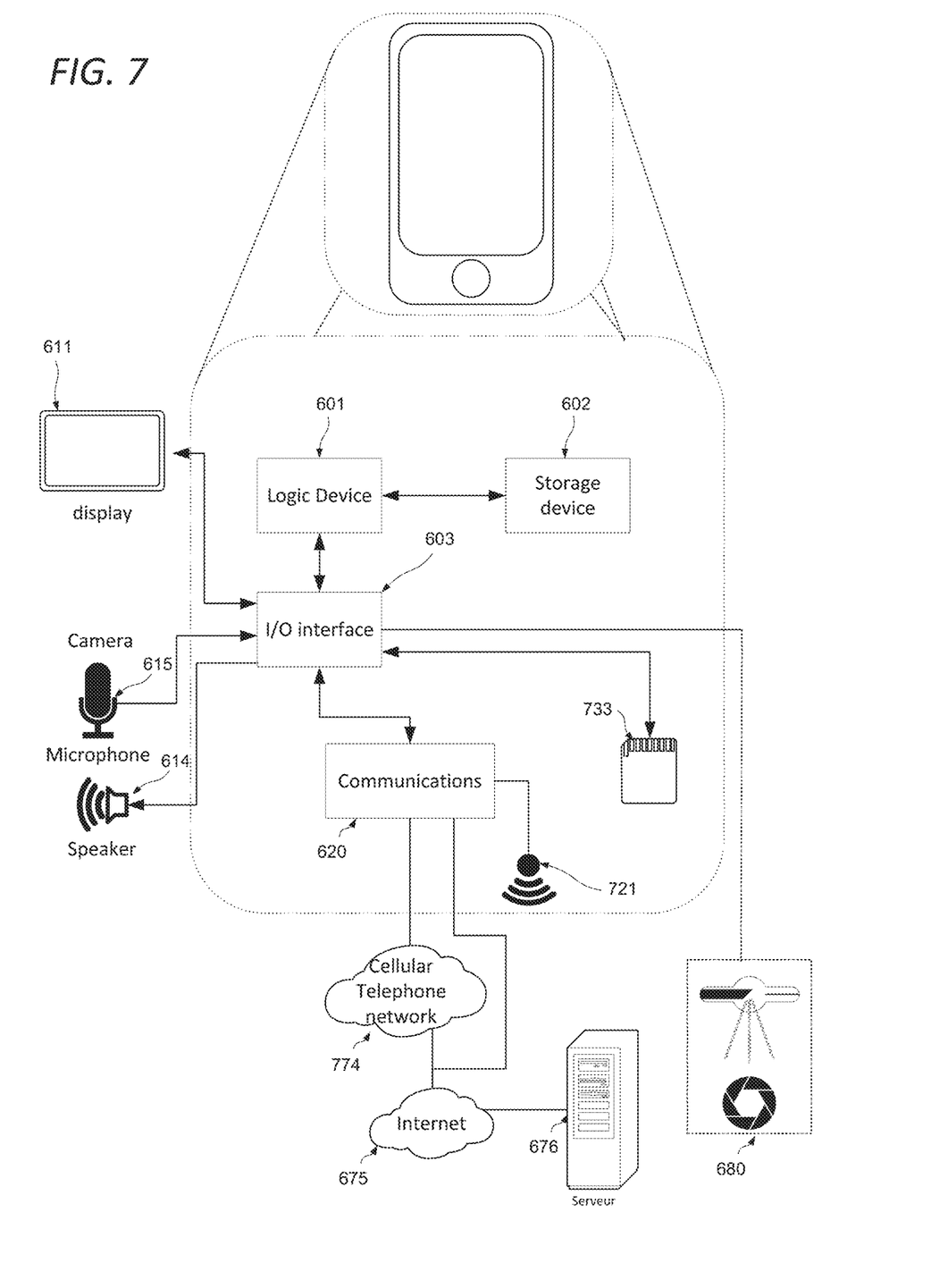
FIG. 7 shows a smartphone device adaptable to constitute an embodiment.
Figure 8:
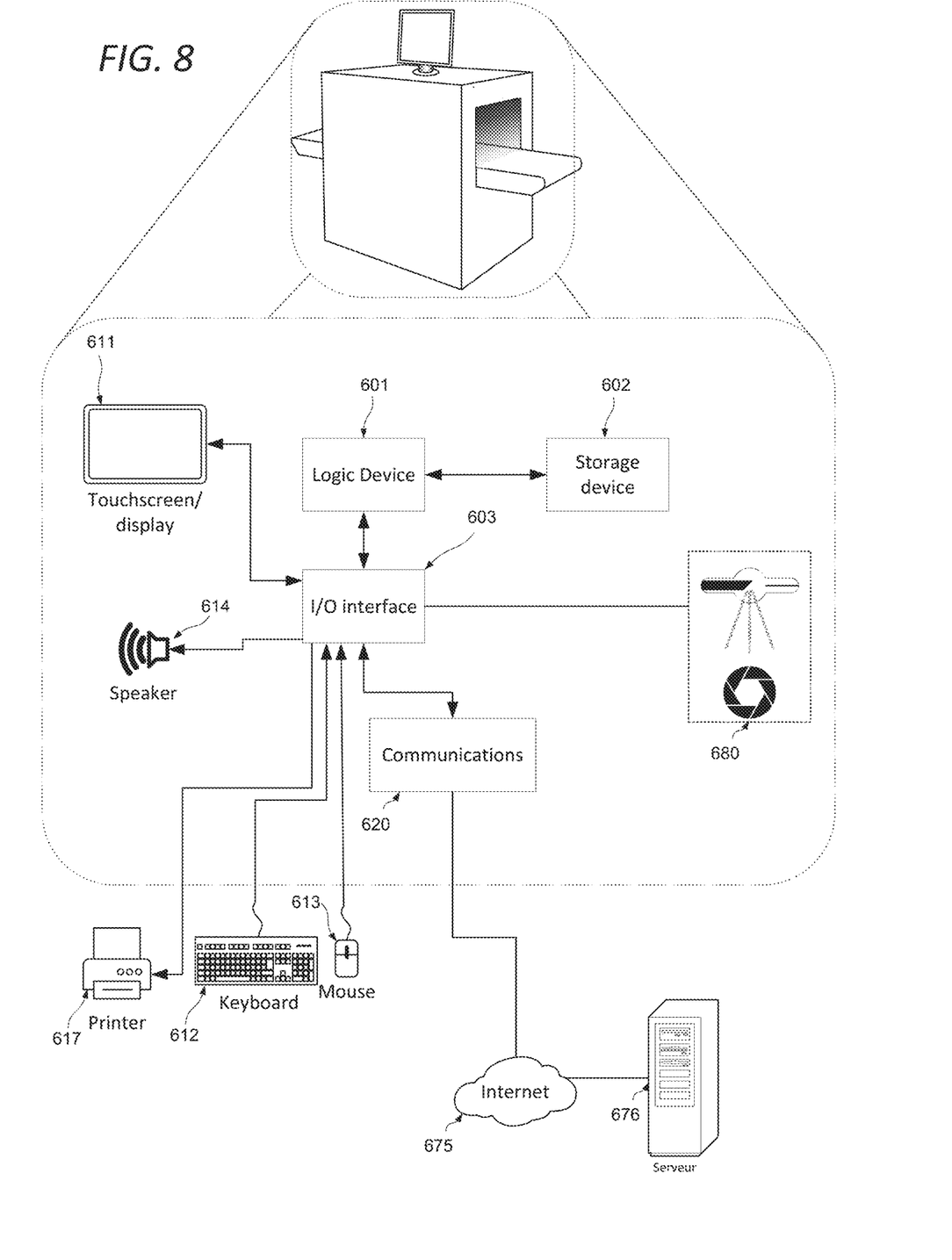
FIG. 8 shows an object scanner system adaptable to constitute an embodiment.
Figure 9:
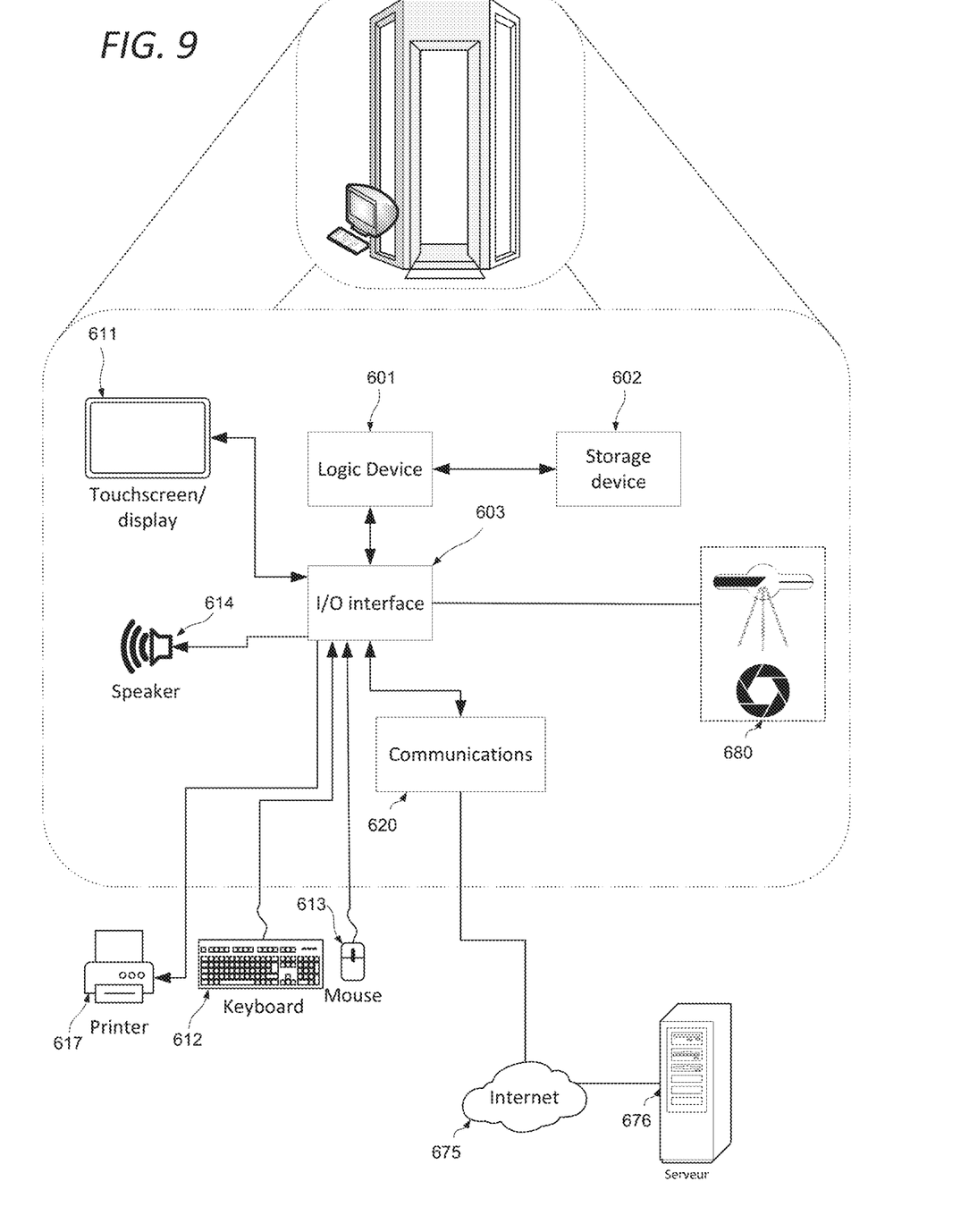
FIG. 9 shows a body scanner system adaptable to constitute an embodiment.

The system of FIG. 6 is intended to reflect a broad range of different types of information handling system. It will be appreciated that many of the subsystems and features described with respect to FIG. 6 are not required for implementation of the invention, but are included to reflect possible systems in accordance with the present invention. It will be appreciated that system architectures vary widely, and the relationship between the different sub-systems of FIG. 6 is merely schematic, and is likely to vary in terms of layout and the distribution of roles in systems. It will be appreciated that, in practice, systems are likely to incorporate different subsets of the various features and subsystems described with respect to FIG. 6. FIGS. 7, 8 and 9 disclose further example devices in accordance with the present invention. Those of ordinary skill in the art will appreciate that systems may be employed in the future which also operate in accordance with the present invention.

FIG. 7 shows a smartphone device adaptable to constitute an embodiment. As shown in FIG. 7, the smartphone device incorporates elements 601, 602, 603, 620, near field communications interface 721, flash memory 733, 614, 615, and 611 as described above. It is in communication with the telephone network 774 and a server 676 via the network 675. Alternative communication mechanisms such as a dedicated network or WiFi may also be used. The device may also be in communication with the scanner device 680. The features disclosed in this figure may also be included within a tablet device as well.

FIG. 8 shows an object scanner system adaptable to constitute an embodiment. This is representative of the devices used in airports and the like for scanning baggage and other articles for concealed weapons or contraband. As shown in FIG. 8, the object scanner system comprises elements 601, 602, 603, 620, 620, and 617 as described above. It may be in communication with a server 676 via the mobile telephone network 674. Alternative communication mechanisms such as a dedicated network or WiFi may also be used. The device is also in communication with the scanner hardware 680.

FIG. 9 shows a body scanner system adaptable to constitute an embodiment. This is representative of the devices used in airports and the like for scanning individuals for concealed weapons or contraband. As shown in FIG. 9, object scanner system comprises elements 601, 602, 603, 620, 620, and 617 as described above. It may be in communication with a server 676 via the mobile telephone network 674. Alternative communication mechanisms such as a dedicated network or WiFi may also be used. The device is also in communication with the scanner hardware 680.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of positioning a virtual camera in a 3D computer generated environment comprising a plurality of objects defined as a plurality of voxels, each said voxel being associated with a density value, such positioning affording a view of a selected one of said objects with minimum occlusion from the other said objects, wherein an occlusion corresponds to an obscuration of an object of interest by obstructing objects from a certain point of view, said method comprising:

calculating a total occlusion value for each of a plurality of predefined virtual camera positions with respect to a reference point within said selected object, wherein each said total occlusion value is determined by calculating the respective path from each said virtual camera position to the reference point, and identifying each voxel along said path, calculating an occlusion value for each voxel along each said respective path by multiplying that voxel's density value by a transfer function value defined for that respective density, summing the occlusion values determined for all voxels along each said respective path calculated for a respective said predefined virtual camera position to obtain a total path occlusion value, selecting the predefined virtual camera position corresponding to the path with the lowest total path occlusion value, and providing a graphical representation of said 3D computer generated environment corresponding to said selected predefined virtual camera position.

2. The method of claim 1 wherein there is defined an occlusion threshold, and where said calculating an occlusion value for each voxel along each said respective path, the occlusion value of any voxel not meeting said threshold is considered to be zero.

3. The method of claim 2 wherein said calculating an occlusion value for each voxel along each said respective path, the occlusion value of any voxel meeting said threshold is considered to have a predetermined value.

4. The method of claim 1 wherein said plurality of predefined virtual camera positions are specified such that each said path passes through a respective vertex of a regular polyhedron.

5. The method of claim 1 wherein each said path is of equal length.

6. The method of claim 1 wherein said respective path from each said virtual camera position to the desired object is determined as the path from each said predefined virtual camera position to the centre of mass of said selected object.

7. The method of claim 1 wherein said respective path from each said virtual camera position to the desired object is determined as the path from each said predefined virtual camera position to the geometric centre of said selected object.

8. The method of claim 7 wherein said calculating the respective path from each said virtual camera position, said calculating an occlusion value for each voxel along each said respective path and said summing the number of occlusions are repeated for each of a plurality of reference points belonging to said selected object.

9. The method of claim 8 wherein said plurality of reference voxels comprises one for every outermost voxel of said selected object meeting a specified density threshold.

10. The method of claim 1 further comprising detecting a part of said selected object presenting a known feature, and wherein the reference point belonging to said selected object with respect to which said plurality of paths is calculated is specified as being situated in said detected part.

11. The method of claim 1 further comprising adjusting the orientation of said selected virtual camera to correspond to a preferred orientation of the selected object.

12. The method of claim 1 further comprising calculating the length of the path through each voxel, and multiplying the occlusion value for each voxel by the length of the path through it.

13. An apparatus adapted to position a virtual camera in a 3D computer generated environment comprising a plurality of objects defined as a plurality of voxels, such positioning affording a view of a selected one of said objects with minimum occlusion from the other said objects, each said voxel being associated with a density value, wherein an occlusion corresponds to an obscuration of an object of interest by obstructing objects from a certain point of view, said apparatus being adapted to calculate a total occlusion value for each of a plurality of predefined virtual camera positions with respect to a reference point within said selected object, wherein each said total occlusion value is determined by calculating the respective path from each said virtual camera position to the reference point, and identifying each voxel along said path, calculating an occlusion value for each voxel along each said respective path by multiplying that voxel's density by a transfer function value defined for that respective density, said apparatus being further adapted to sum the occlusion values determined for all voxels along each said respective path calculated for a respective said predefined virtual camera position to obtain a total path occlusion value; said apparatus being still further adapted to select the predefined virtual camera position corresponding to the path with the lowest total path occlusion value, said apparatus being further adapted to provide a graphical representation of said 3D computer generated environment corresponding to said selected predefined virtual camera position.

14. A computer program product comprising computer program stored on a non-transitory medium for positioning a virtual camera in a 3D computer generated environment comprising a plurality of objects defined as a plurality of voxels, each said voxel being associated with a density value, such positioning affording a view of a selected one of said objects with minimum occlusion from the other said objects, wherein an occlusion corresponds to an obscuration of an object of interest by obstructing objects from a certain point of view, said computer program having computing instructions for:

calculating a total occlusion value for each of a plurality of predefined virtual camera positions with respect to a reference point within said selected object, wherein each said total occlusion value is determined by calculating the respective path from each said virtual camera position to the reference point, and identifying each voxel along said path, calculating an occlusion value for each voxel along each said respective path by multiplying that voxel's density by a transfer function value defined for that respective density, summing the occlusion values determined for all voxels along each said respective path calculated for a respective said predefined virtual camera position to obtain a total path occlusion value, selecting the predefined virtual camera position corresponding to the path with the lowest total path occlusion value, and providing a graphical representation of said 3D computer generated environment corresponding to said selected predefined virtual camera position.

* * * * *